(12) United States Patent
Rotondi (10) Patent No.: US 7,048,238 B2
(45) Date of Patent: May 23, 2006

(54) TELESCOPE SUPPORT STAND SYSTEM

(76) Inventor: Vito Rotondi, 477 Springwood Dr., Roselle, IL (US) 60172

( * ) Notice: Subject to any disclaimer, the term of this patent is extended or adjusted under 35 U.S.C. 154(b) by 55 days.

(21) Appl. No.: 10/360,476

(22) Filed: Feb. 5, 2003

(65) Prior Publication Data

US 2003/0116684 A1 Jun. 26, 2003

Related U.S. Application Data

(63) Continuation-in-part of application No. 09/847,153, filed on May 1, 2001, now abandoned.

(51) Int. Cl.
A47F 5/00 (2006.01)

(52) U.S. Cl. .................. 248/125.8; 248/669; 248/132; 248/161; 248/405; 248/157; 359/399; 359/430; 108/147.19; 108/147

(58) Field of Classification Search ............... 359/399, 359/430; 248/125.8, 650, 651, 653, 669, 248/132, 161, 405, 157, 188.2, 188.4, 188.5, 248/404, 676; 108/147.19, 147, 150
See application file for complete search history.

(56) References Cited

U.S. PATENT DOCUMENTS

| | | | |
|---|---|---|---|
| 176,133 A | 4/1876 | Haworth | |
| 2,890,010 A * | 6/1959 | Barkheimer | 108/7 |
| 3,358,951 A | 12/1967 | Carter | 248/11 |
| 3,828,694 A | 8/1974 | Nestler et al. | 108/10 |
| 3,840,284 A * | 10/1974 | Rand | 359/430 |
| 3,887,155 A | 6/1975 | Bertalot | 248/333 |
| 3,951,511 A * | 4/1976 | Parsons | 359/430 |
| 4,101,005 A | 7/1978 | Fewkes | 187/17 |
| 4,196,881 A | 4/1980 | Davidson | 248/157 |
| 4,400,066 A * | 8/1983 | Byers | 359/430 |
| 4,570,547 A | 2/1986 | Colby | 108/141 |
| 4,627,591 A | 12/1986 | Heckmann | 248/411 |
| 4,635,565 A | 1/1987 | Novak | 108/147 |
| 4,747,353 A | 5/1988 | Watt | 108/146 |
| 4,765,277 A | 8/1988 | Bailey et al. | 119/51 |
| 4,767,014 A * | 8/1988 | Vail et al. | 211/207 |
| 4,807,836 A | 2/1989 | Price et al. | 248/123.1 |
| 4,922,836 A | 5/1990 | Damico | 108/144 |
| 5,020,752 A | 6/1991 | Rizzi et al. | 248/162.1 |
| 5,039,215 A * | 8/1991 | Hirabayashi | 359/430 |
| 5,271,320 A | 12/1993 | Reneau | 108/147 |
| 5,385,323 A | 1/1995 | Garelick | 248/161 |
| 5,428,928 A | 7/1995 | Hellwig et al. | 52/239 |
| 5,489,142 A * | 2/1996 | Mathieu | 297/327 |
| 5,553,550 A | 9/1996 | Doyle | 108/144 |
| 5,775,234 A | 7/1998 | Solomon et al. | 108/147 |

OTHER PUBLICATIONS www.celestron.com/polar.htm, Celestron Delestron Support Polar Alignment, Comprehensive Polar Alignment Procedure, Feb. 23, 2005, pp. 1-7.*

Jerry Lodriguss,Catching the Light, Feb. 23, 2005,www.astropix.com/HTML/I_ASTROP/I07/I0701/I0701.HTM, pp. 1-6.*

* cited by examiner

Primary Examiner—Kimberly Wood
(74) Attorney, Agent, or Firm—Welsh & Katz, Ltd.

(57) ABSTRACT

A telescope support stand system for side cutaway view of the present invention in the contracted position. The telescope support stand system includes a base that is permanently secured to a floor, a lower tube attached to the base, an upper tube slidably positioned about the lower tube, an elevating unit within the lower tube for elevating the upper tube, and a support plate attached to the upper tube for mounting a telescope thereto. The outer tube preferably includes a plurality of alignment plates for providing a reduced friction guide surface for sliding about the lower tube.

18 Claims, 9 Drawing Sheets

TELESCOPE SUPPORT STAND SYSTEM

CROSS-REFERENCE TO RELATED U.S. PATENT APPLICATION

I hereby claim benefit under Title 35, United States Code, Section 120 of U.S. patent application Ser. No. 09/847,153 filed May 1, 2001, now abandoned. This application is a continuation-in-part of the Ser. No. 09/847,153 application. The Ser. No. 09/847,153 application is currently abandoned. The Ser. No. 09/847,153 application is hereby incorporated by reference into this application.

BACKGROUND OF THE INVENTION

1. Field of the Invention

The present invention relates generally to telescope stands and more specifically it relates to a telescope support stand system for providing a convenient and stable support stand for a telescope.

2. Description of the Prior Art

Telescope stands have been in use for years. Typically, a conventional telescope stand has one or more legs that support a telescope upon thereof. A commonly utilized telescope stand is comprised of a typical tripod structure. Many conventional telescopes are motorized for allowing accurate rotation thereof for allowing tracking of celestial objects. However, prior to installing the telescope upon the support stand the user must ensure that the support stand is polar aligned. This process must be repeated each time the user desires to utilize the telescope.

Unfortunately, conventional telescope stands do not provide a stable system for adequately and conveniently supporting a telescope upon thereof. In addition, conventional telescope stands must constantly be realigned to ensure proper polar and horizontal positioning. Another problem with conventional telescope stands is that they are easily moved from external forces such as wind or an individual engaging the stand.

Examples of patented devices which are illustrative of such prior art include U.S. Pat. No. 176,133 to Haworth; U.S. Pat. No. 3,828,694 to Nestler et al.; U.S. Pat. No. 5,020,752 to Rizzi et al.; U.S. Pat. No. 4,747,353 to Watt; U.S. Pat. No. 4,765,277 to Bailey et al.; U.S. Pat. No. 5,385,323 to Garelick; U.S. Pat. No. 3,358,951 to Carter; and U.S. Pat. No. 4,196,881 to Davidson.

While these devices may be suitable for the particular purpose to which they address, they are not as suitable for providing a convenient and stable support stand for a telescope. Conventional telescope stands do not provide a convenient and stable structure for telescopes.

In these respects, the telescope support stand system according to the present invention substantially departs from the conventional concepts and designs of the prior art, and in so doing provides an apparatus primarily developed for the purpose of providing a convenient and stable support stand for a telescope.

SUMMARY OF THE INVENTION

In view of the foregoing disadvantages inherent in the known types of telescope stands now present in the prior art, the present invention provides a new telescope support stand system construction wherein the same can be utilized for providing a convenient and stable support stand for a telescope.

The general purpose of the present invention, which will be described subsequently in greater detail, is to provide a new telescope support stand system that has many of the advantages of the telescope stands mentioned heretofore and many novel features that result in a new telescope support stand system which is not anticipated, rendered obvious, suggested, or even implied by any of the prior art telescope stands, either alone or in any combination thereof.

To attain this, the present invention generally comprises a base that is permanently secured to a floor, a lower tube attached to the base, an upper tube slidably positioned within the lower tube, an elevating unit within the lower tube for elevating the upper tube, and a support plate attached to the upper tube for mounting a telescope thereto. The outer tube preferably includes a plurality of alignment plates for providing a reduced friction guide surface for sliding about the lower tube.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a telescope support stand system that will overcome the shortcomings of the prior art devices.

A second object is to provide a telescope support stand system for providing a convenient and stable support stand for a telescope.

Another object is to provide a telescope support stand system that that does not need to be realigned after installation.

An additional object is to provide a telescope support stand system that is simple and easy to permanently install.

A further object is to provide a telescope support stand system that is not easily moved after installation.

Another object is to provide a telescope support stand system that aids in astrophotography by eliminating vibrations and movements.

A further object is to provide a telescope support stand system that allows for simple vertical adjustment.

Another object is to provide a telescope support stand system that maintains proper polar alignment at various adjusted heights.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 9 illustrate a telescope support stand system 10, which comprises a base 20 that is permanently secured to a floor 16, a lower tube 30 attached to the base 20, an upper tube 40 slidably positioned about the lower tube 30, an elevating unit 70 within the lower tube 30 for elevating the upper tube 40, and a support plate 50 attached to the upper tube 40 for mounting a telescope 12 thereto. The outer tube preferably includes a plurality of alignment plates 90 for providing a reduced friction guide surface for sliding about the lower tube 30.

As shown in FIGS. 1 through 6 of the drawings, the base 20 is comprised of a relatively flat structure that may be attached to various surfaces such as a floor 16. The base 20 may be attached to the floor 16 utilizing various well-known attachment means such as but not limited to fasteners 22 and adhesives. The base 20 may be comprised of various structures, designs and materials as can be appreciated by one skilled in the art.

The lower tube 30 is attached to an upper surface of the base 20 as further shown in FIGS. 1 through 6 of the drawings. The lower tube 30 may have various lengths, widths and shapes as can be appreciated by one skilled in the art. The lower tube 30 may be constructed by various means, however conventional extrusion methods are preferably utilized to construct the lower tube 30.

As shown in FIGS. 1 through 6 of the drawings, the upper tube 40 is formed to slidably surround the lower tube 30. It can be appreciated that the upper tube 40 may be formed to slidably fit within the lumen of the lower tube 30. As best shown in FIG. 7 of the drawings, the lower tube 30 and the upper tube 40 have angled corner sections that correspond to one another. In addition, the lower tube 30 and the upper tube 40 preferably have a similar cross sectional shape as further shown in FIG. 7 of the drawings.

Figure 1:
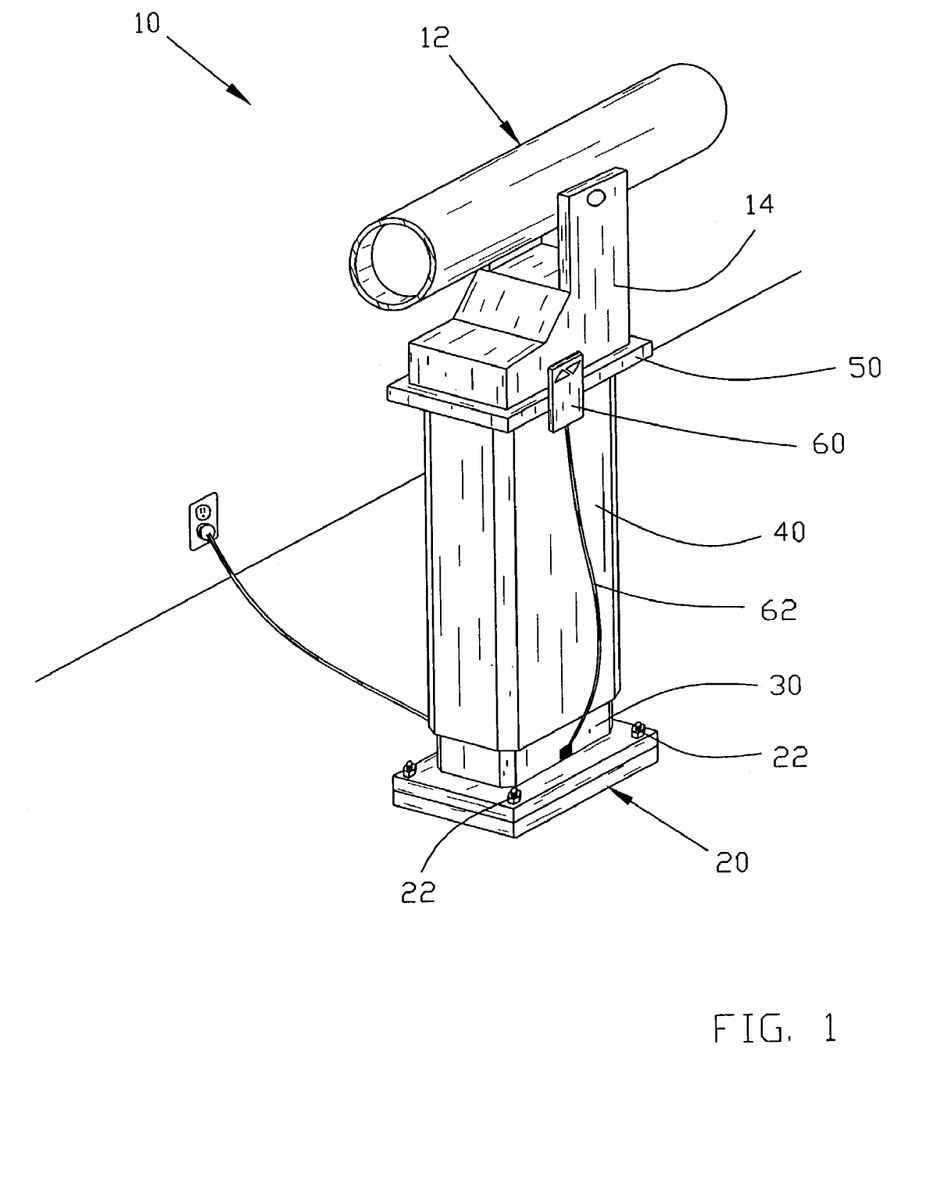
FIG. 1 is an upper perspective view of the present invention supporting a conventional telescope.
Figure 2:
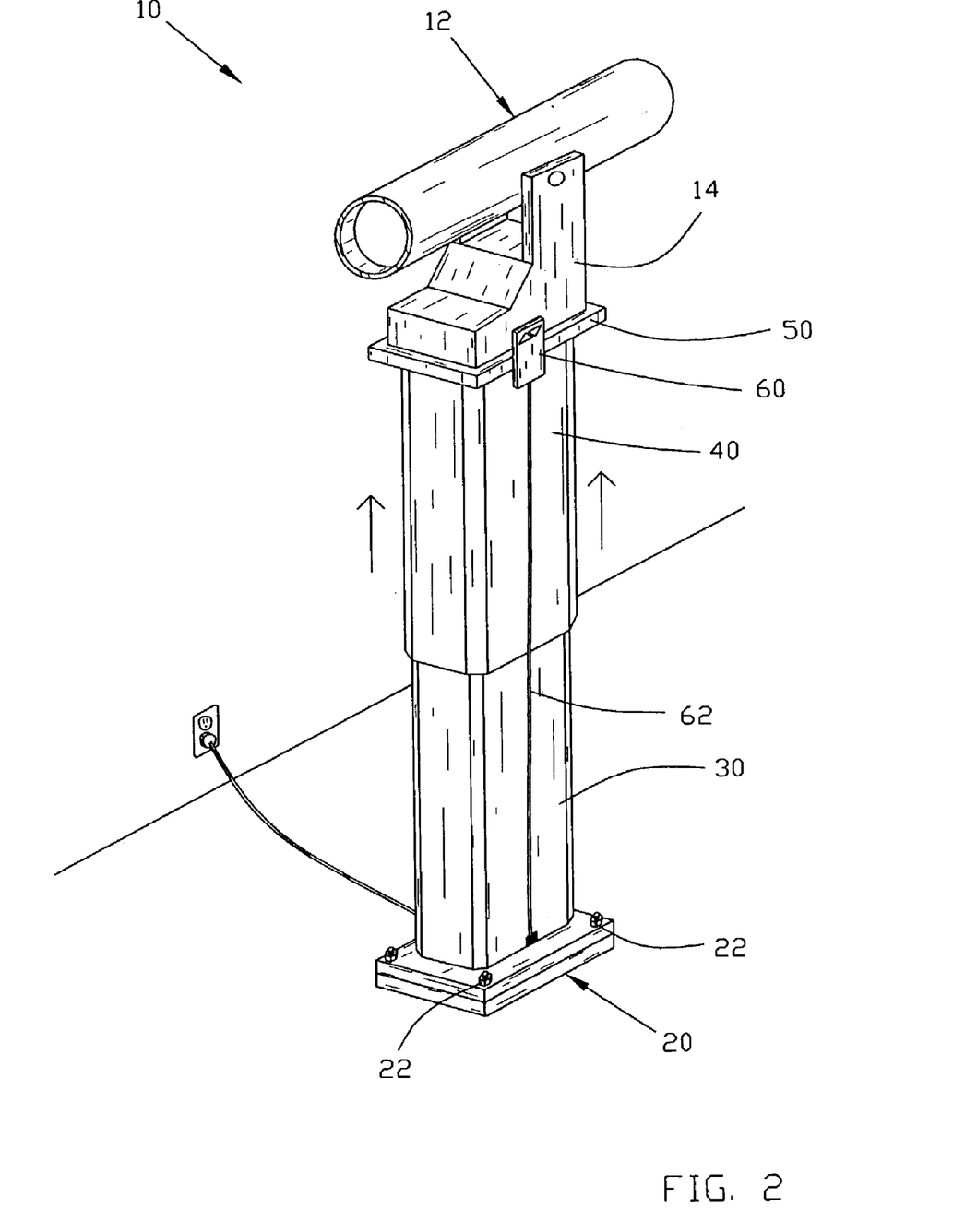
FIG. 2 is an upper perspective view of the present invention in an extended position.
Figure 3:
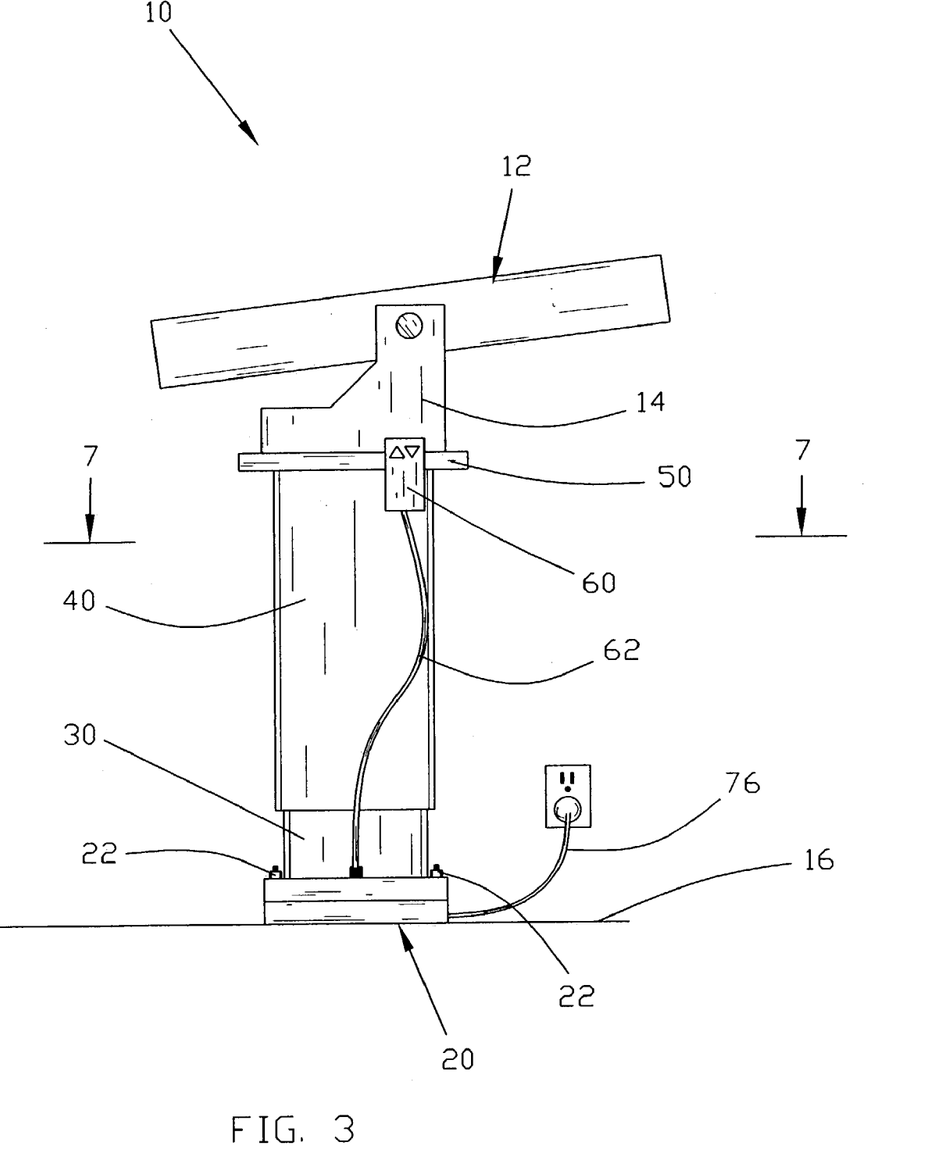
FIG. 3 is a side view of the present invention.
Figure 4:
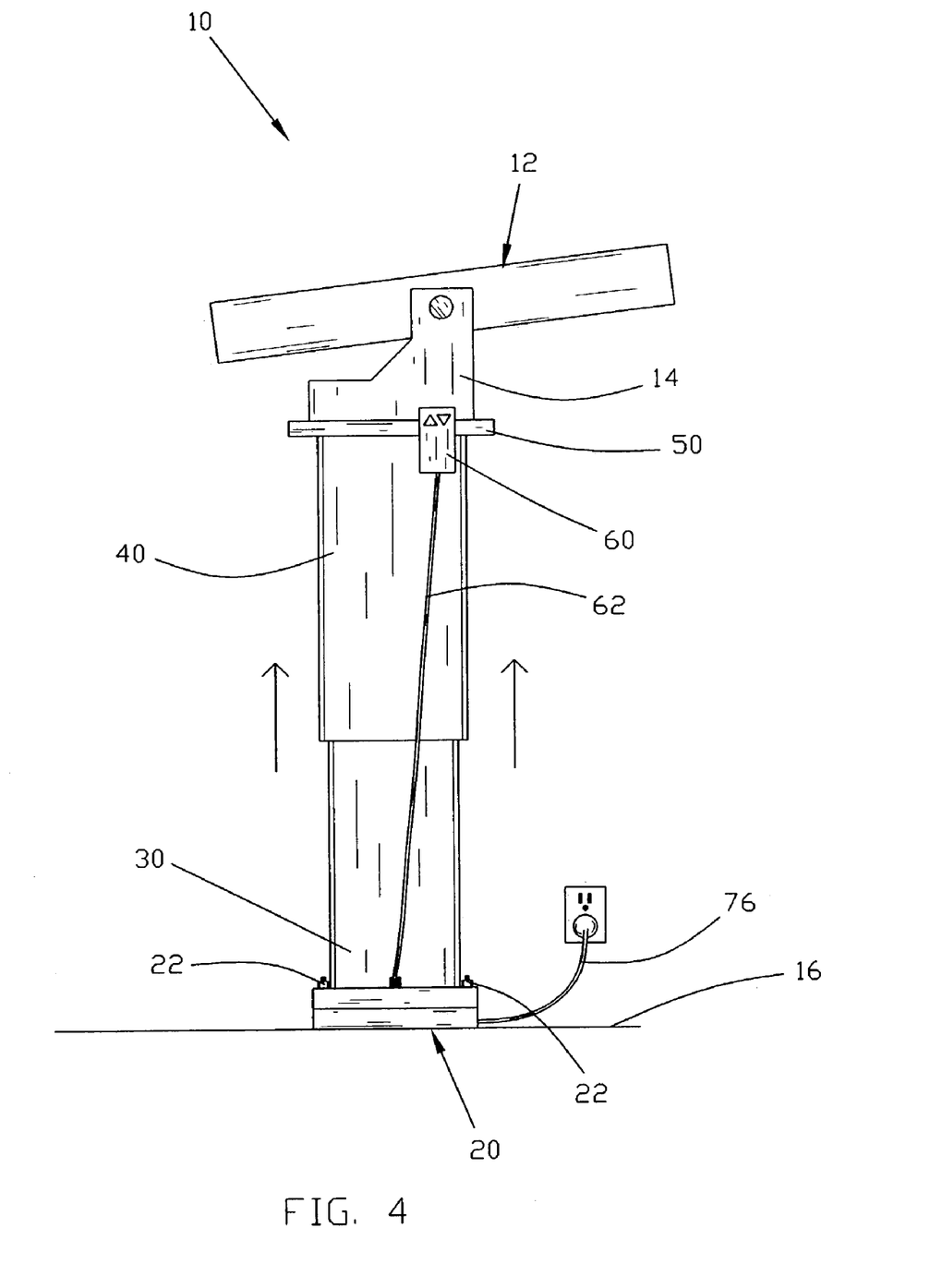
FIG. 4 is a side view of the present invention in an extended position.
Figure 5:
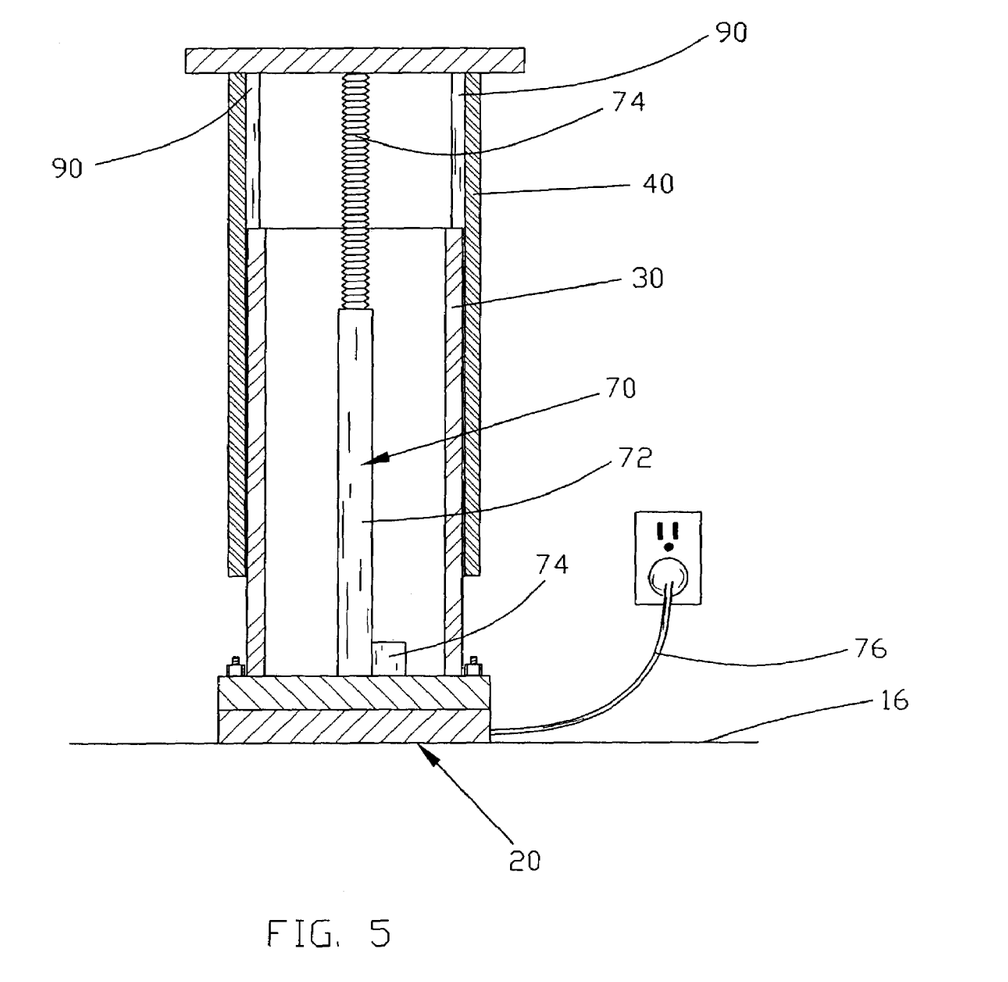
FIG. 5 is a side cutaway view of the present invention in the contracted position.
Figure 6:
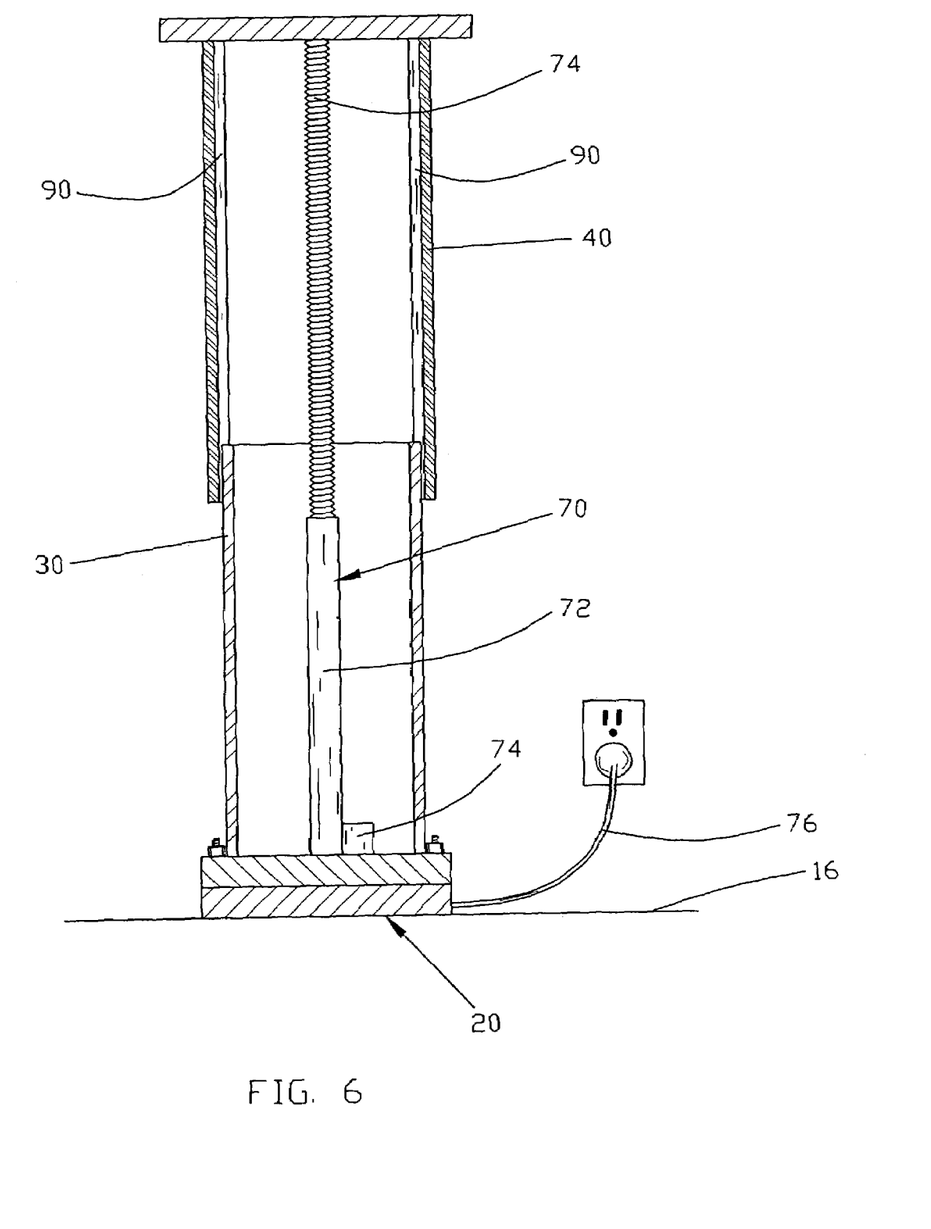
FIG. 6 is a side cutaway view of the present invention in the extended position.
Figure 7:
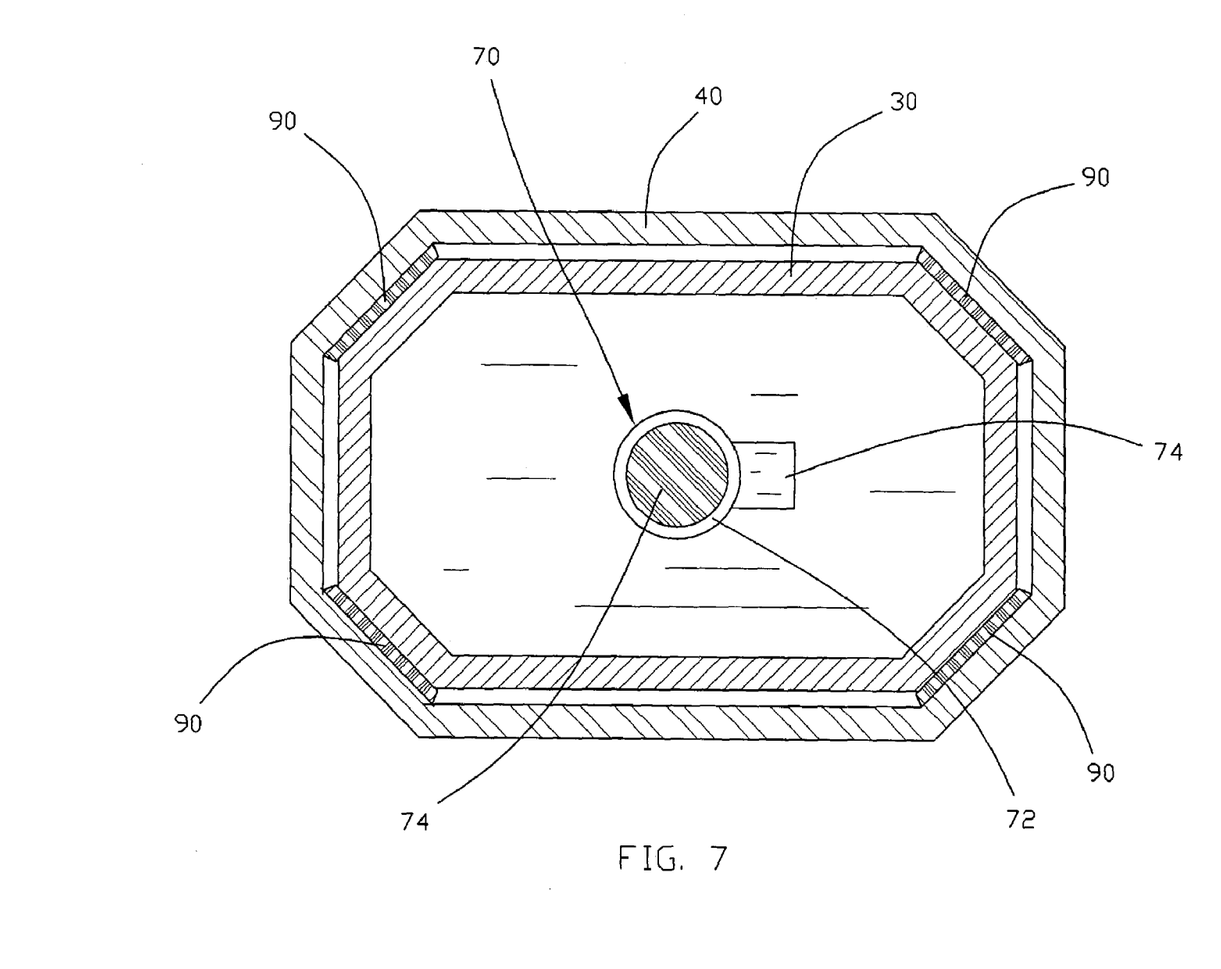
FIG. 7 is a cross sectional view taken along line 7—7 of FIG. 3.

As shown in FIGS. 5 through 7 of the drawings, a plurality of alignment plates 90 are preferably attached within the inner corner surfaces of the upper tube 40 for slidably engaging the corresponding outer corner surface of the lower tube 30. The alignment plates 90 are preferably constructed of a relatively low friction material such as but not limited to high density plastic. The alignment plates 90 are preferably formed to provide a relatively snug fit about the upper tube 40 to reduce undesirable movement of the upper tube 40. As shown in FIGS. 5 and 6 of the drawings, the alignment plates 90 are preferably constructed of an elongate structure to ensure complete contact with the lower tube 30.

As shown in FIGS. 1 through 4 of the drawings, a support plate 50 is attached to the upper portion of the upper tube 40. The support plate 50 is formed for securely mounting a support housing 14 of a telescope 12 thereof as are commonly found within the industry.

As shown in FIGS. 5 through 7 of the drawings, an elevating unit 70 is positioned within the lower tube 30. The elevating unit 70 is mechanically attached to either the upper tube 40 or the support plate 50 for elevating and lowering the upper tube 40 with respect to the lower tube 30. The elevating unit 70 is preferably comprised of a mechanical actuator 72 with a motor 74 and a power cord 76. The elevating unit 70 may be constructed of an electrical-mechanical or a pressurized air system as can be appreciated by one skilled in the art. As shown in FIGS. 1 through 4 of the drawings, a control unit 60 in communication with the elevating unit 70 by a communication cord 62 is provided for allowing control of the elevating unit 70.

A product manufactured by LINAK (www.linak.com) entitled the DESKLINE system is considered relevant to the elevating unit 70, the lower tube 30 and the upper tube 40 structure of the present invention and is incorporated herein by reference. The DESKLINE system is currently utilized for elevating desks, tables, kitchen units and even heavy-duty industrial workbenches.

Figure 8:
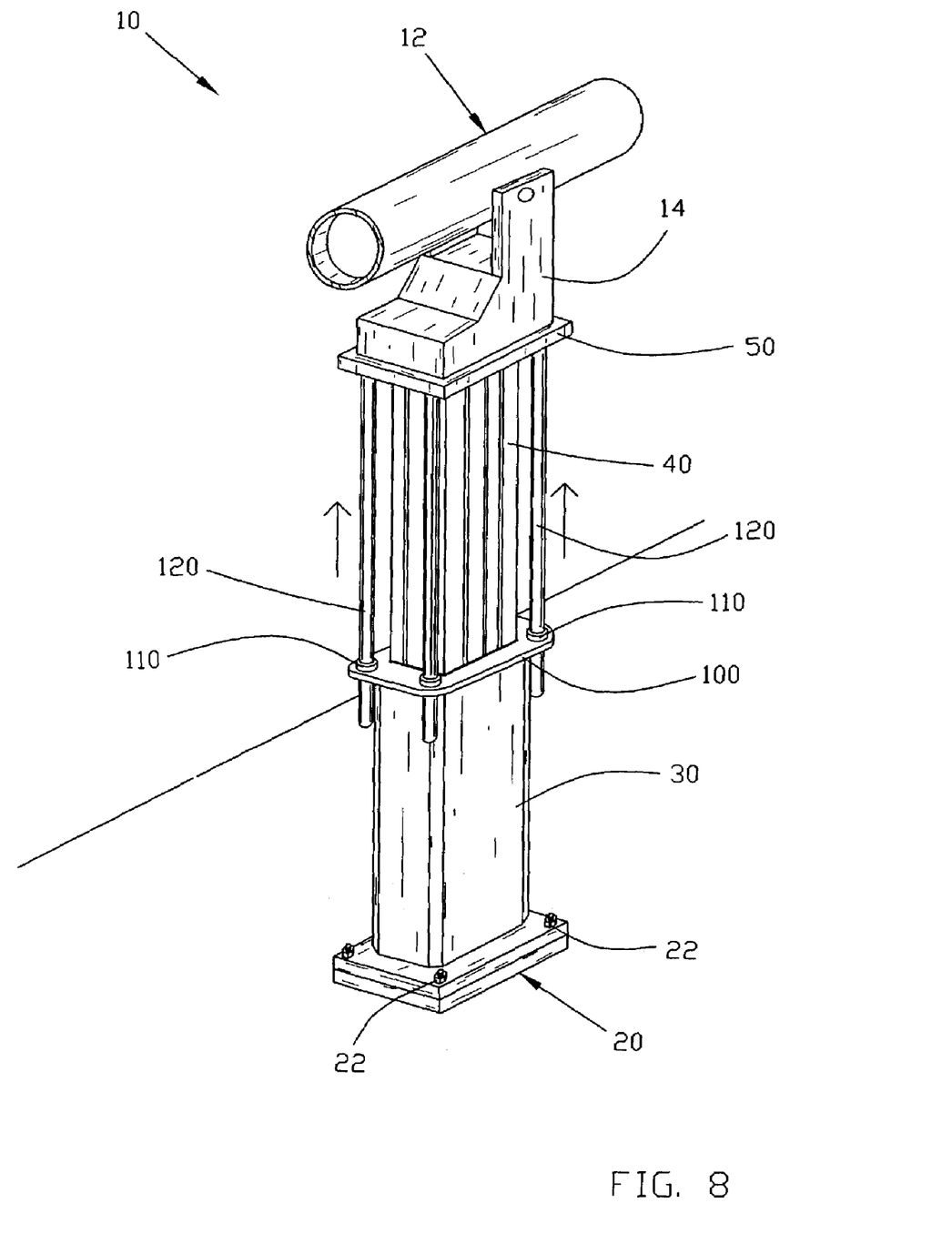
FIG. 8 is an upper perspective view of an alternative embodiment of the present invention.
Figure 9:
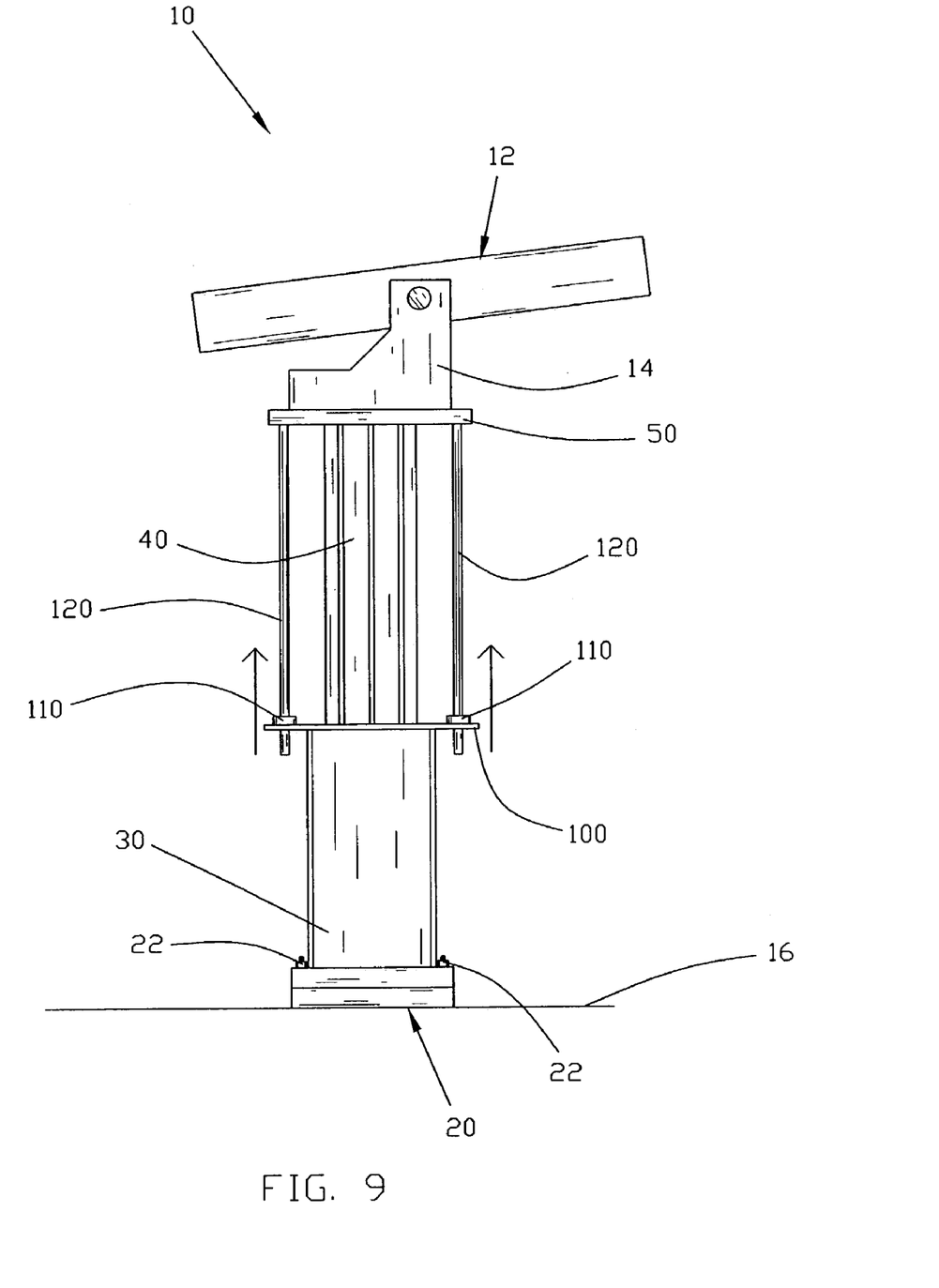
FIG. 9 is a side view of the alternative embodiment of the present invention.

An alternative embodiment of the present invention is illustrated in FIGS. 8 and 9 illustrating the upper tube 40 slidably positioned within the lumen of the lower tube 30 with a plurality of alignment rods 120 attached to the support plate 50 of the upper tube 40. An upper plate 100 is attached to the upper portion of the lower tube 30 and includes a plurality of support bearings 110 within for slidably receiving the plurality of alignment rods 120 thereby maintaining proper alignment of the upper tube 40 and support plate 50 during operation of the present invention.

In use, the user first polar aligns the present invention. After the present invention is properly aligned, the base 20 is permanently and non-movably secured to the floor 16 or similar structure. The user then is able to manipulate the elevation of the telescope 12 by manipulating the control unit 60. If the telescope 12 is desired to be elevated, the upper tube 40 is elevated by the elevating unit 70 to the desired position with the alignment plates 90 sliding about the exterior surface of the lower tube 30. If the telescope 12 is desired to be lowered, the upper tube 40 is lowered by the elevating unit 70 to the desired position with the alignment plates 90 sliding about the exterior surface of the lower tube 30. This process continues while not requiring the user to realign the present invention nor the telescope 12 over extended periods of time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for Telescope Support Stand System |
| --- |
| ☐ ENVIRONMENTAL ELEMENTS |
| ☐ |
| ☐ |
| ☐ |
| ☐ |
| ☐ |
| ☐ |
| ☐ |
| ☐ |
| ☐ 10. Telescope Support Stand System |
| ☐ 11. |
| ☐ 12. Telescope |
| ☐ 13. |
| ☐ 14. Support Housing |
| ☐ 15. |
| ☐ 16. Floor |
| ☐ 17. |
| ☐ 18. |
| ☐ 19. |
| ☐ 20. Base |
| ☐ 21. |
| ☐ 22. Fasteners |
| ☐ 23. |
| ☐ 24. |
| ☐ 25. |
| ☐ 26. |
| ☐ 27. |
| ☐ 28. |
| ☐ 29. |
| ☐ 30. Lower Tube |
| ☐ 31. |
| ☐ 32. |
| ☐ 33. |
| ☐ 34. |
| ☐ 35. |
| ☐ 36. |
| ☐ 37. |
| ☐ 38. |
| ☐ 39. |
| ☐ |
| ☐ |
| ☐ |
| ☐ |
| ☐ |
| ☐ |
| ☐ |
| ☐ 40. Upper Tube |
| ☐ 41. |
| ☐ 42. |
| ☐ 43. |
| ☐ 44. |
| ☐ 45. |
| ☐ 46. |
| ☐ 47. |
| ☐ 48. |

| -continued |
| --- |
| Index of Elements for Telescope Support Stand System |
| ☐ 49. |
| ☐ 50. Support Plate |
| ☐ 51. |
| ☐ 52. |
| ☐ 53. |
| ☐ 54. |
| ☐ 55. |
| ☐ 56. |
| ☐ 57. |
| ☐ 58. |
| ☐ 59. |
| ☐ 60. Control Unit |
| ☐ 61. |
| ☐ 62. Communication Cord |
| ☐ 63. |
| ☐ 64. |
| ☐ 65. |
| ☐ 66. |
| ☐ 67. |
| ☐ 68. |
| ☐ 69. |
| ☐ 70. Elevating Unit |
| ☐ 71. |
| ☐ 72. Actuator |
| ☐ 73. |
| ☐ 74. Motor |
| ☐ 75. |
| ☐ 76. Power Cord |
| ☐ 77. |
| ☐ 78. |
| ☐ 79. |
| ☐ 80. |
| ☐ |
| ☐ 90. Alignment Plate |
| ☐ |
| ☐ 100. Upper Plate |
| ☐ |
| ☐ 110. Support Bearings |
| ☐ 120. Alignment Rods |

I claim:

1. A telescope support stand system for adjustably supporting a telescope, comprising:
    a base permanently affixed to a floor, such that the base is in polar alignment;
    a lower tube extending vertically from said base;
    an upper tube slidably positioned about said lower tube;
    a support plate attached to an upper end of said upper tube;
    a personally portable telescope unit removably attached to said support plate; and
    an elevating unit for manipulating a vertical position of said upper tube with respect to said lower tube wherein immediately upon a telescope being attached to the support plate the telescope is in polar alignment.

2. The telescope support stand system of claim 1, wherein said elevating unit includes a control unit.

3. The telescope support stand system of claim 2, wherein said elevating unit is comprised of an electric actuator system.

4. The telescope support stand system of claim 1, wherein said upper tube and said lower tube have a similar cross section shape.

5. The telescope support stand system of claim 4, wherein said upper tube and said lower tube have rectangular shape with angled corners.

6. The telescope support stand system of claim 5, including a plurality of alignment plates, for initial alignment of the base, within an inner surface of said angled corners of said upper tube.

7. The telescope support stand system of claim 6, wherein said alignment plates are comprised of a wear resistant and reduced friction material.

8. The telescope support stand system of claim 7, wherein said alignment plates are formed to snugly engage said lower tube.

9. The telescope support stand system of claim 8, wherein said alignment plates are comprised of a high density plastic.

10. A telescope support stand system for adjustably supporting a telescope, comprising:
a base permanently affixed to a floor, such that the base is in polar alignment;
a lower tube extending vertically from said base;
an upper tube slidably positioned about said lower tube;
a support plate attached to an upper end of said upper tube;
a personally portable telescope unit removably attached to said support plate;
an elevating unit for manipulating a vertical position of said upper tube with respect to said lower tube wherein immediately upon a telescope being attached to the support plate the telescope is in polar alignment;
an upper plate attached to an upper portion of said lower tube; a plurality of support bearings within said upper plate; and
a plurality of alignment rods attached to said support plate slidably extending within said support bearings for aligning said support plate and said upper tube.

11. The telescope support stand system of claim 10, wherein said elevating unit includes a control unit.

12. The telescope support stand system of claim 11, wherein said elevating unit is comprised of an electric actuator system.

13. The telescope support stand system of claim 10, wherein said upper tube and said lower tube have a similar cross section shape.

14. The telescope support stand system of claim 13, wherein said upper tube and said lower tube have rectangular shape with angled corners.

15. The telescope support stand system of claim 14, including a plurality of alignment plates, for initial alignment of the base, within an inner surface of said angled corners of said upper tube.

16. The telescope support stand system of claim 15, wherein said alignment plates are comprised of a wear resistant and reduced friction material.

17. The telescope support stand system of claim 16, wherein said alignment plates are formed to snugly engage said lower tube.

18. The telescope support stand system of claim 17, wherein said alignment plates are comprised of a high density plastic.

* * * * *